March 18, 1958  L. D. DAVIS, JR  2,827,131
CLASP BRAKE

Filed Feb. 15, 1956  3 Sheets-Sheet 1

INVENTOR.
Louis D. Davis, Jr.
BY Walter S. Schlegel, Jr.
Atty.

March 18, 1958

L. D. DAVIS, JR 2,827,131

CLASP BRAKE

Filed Feb. 15, 1956

INVENTOR.
Louis D. Davis, Jr.
BY Walter L. Schlegel, Jr.
Atty.

United States Patent Office 2,827,131
Patented Mar. 18, 1958

2,827,131

CLASP BRAKE

Louis D. Davis, Jr., Chicago, Ill., assignor to American Steel Foundries, Chicago, Ill., a corporation of New Jersey Application February 15, 1956, Serial No. 565,669

4 Claims. (Cl. 188—56)

This invention relates to unit cylinder clasp brake arrangements for four wheel passenger car trucks of high speed light weight trains.

Due to the increase in speed of light weight trains it has been necessary to lower the center of gravity of the cars to prevent derailment of the cars when traveling along curved track. Lowering of the center of gravity of the cars has been accomplished by lowering the truck frames and by decreasing the space between the truck frames and the car body, thereby materially decreasing the space available for brake rigging. It is, therefore, an object of the invention to provide a clasp brake arrangement which occupies a minimum amount of space.

Another object of the invention resides in the provision of an independently operable clasp brake arrangement for each side of a four wheel truck.

A further object of the invention resides in the provision of a unit cylinder clasp brake arrangement which is relatively simple and inexpensive in construction and efficient and reliable in operation.

Another object of the invention resides in the provision of a unit cylinder clasp brake arrangement in which the brake lever actuating parts are mounted along the outboard side of the side rail of the truck frame to facilitate inspection and servicing of the parts.

Another object of the invention resides in the provision of a unit cylinder clasp brake arrangement in which all of the parts thereof are disposed below the upper surface of the truck frame.

Another object of the invention resides in the provision of a unit cylinder clasp brake arrangement which may be installed for use to coact with an off-wheel rotor brake arrangement to decelerate a wheel and axle assembly.

The invention embodies other novel features, details of construction and arrangement of parts which are hereinafter set forth in the specification and claims and illustrated in the accompanying drawings, wherein:

Figure 4 is an end elevational view taken from the right end of the brake arrangement illustrated in Figure 2.

Figure 1:
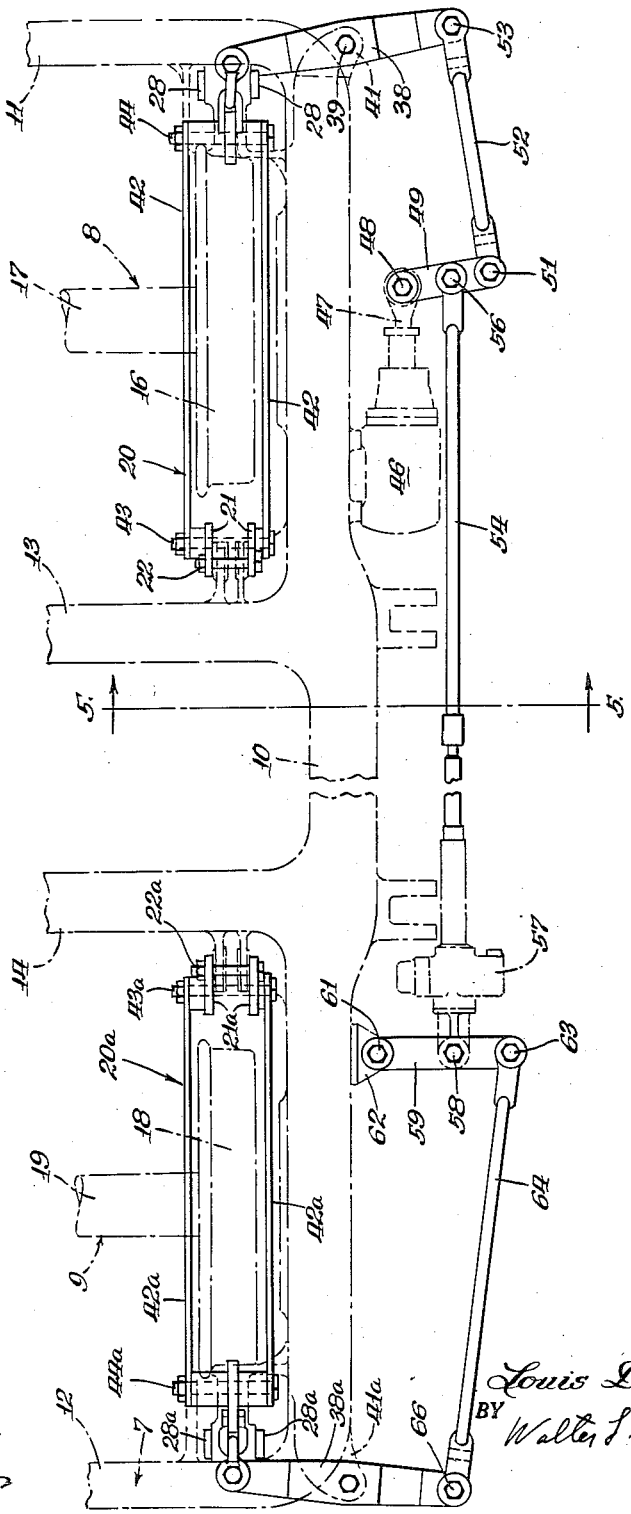
Figure 1 is a top plan view illustrating a unit cylinder clasp brake arrangement embodying features of the invention, the arrangement being shown as mounted on one side of a truck frame of a four wheel passenger car truck.
Figure 2:
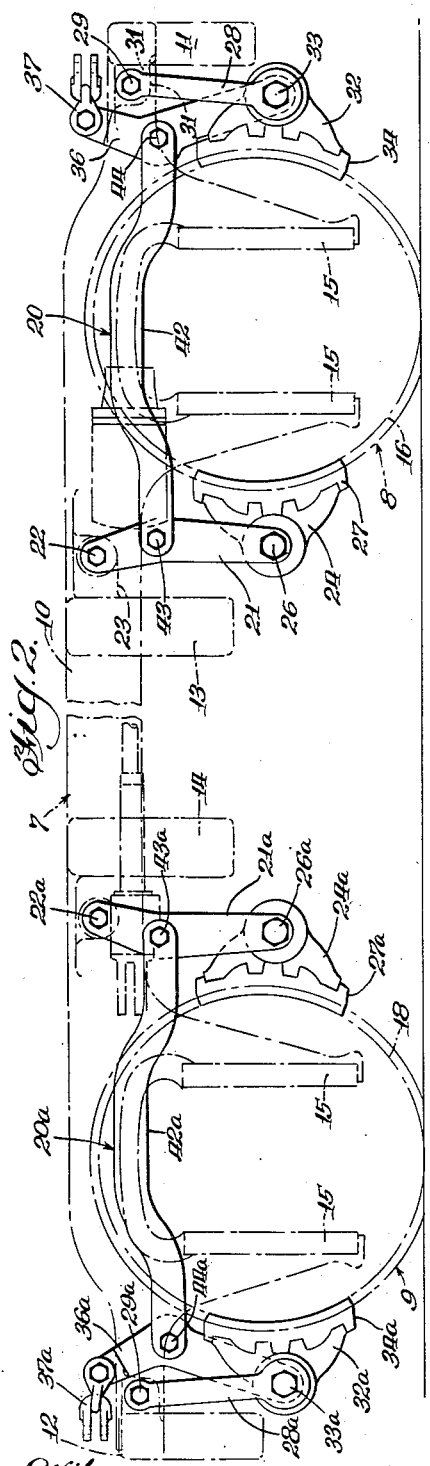
Figure 2 is a side elevational view of same.
Figure 3:
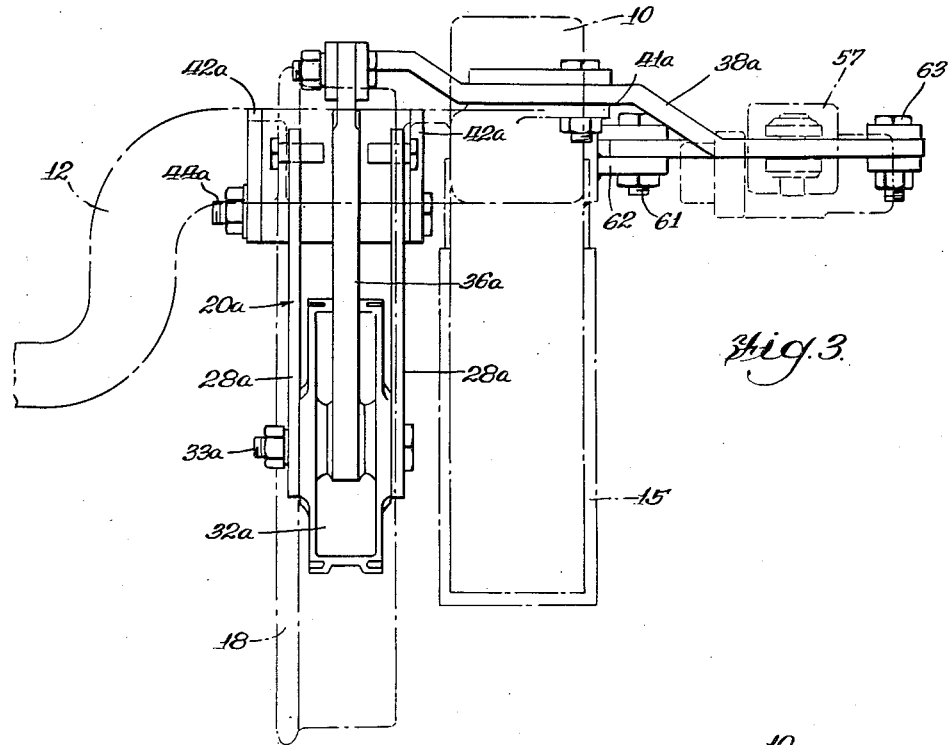
Figure 3 is an end elevational view taken from the left end of the brake arrangement illustrated in Figure 2.
Figure 5:
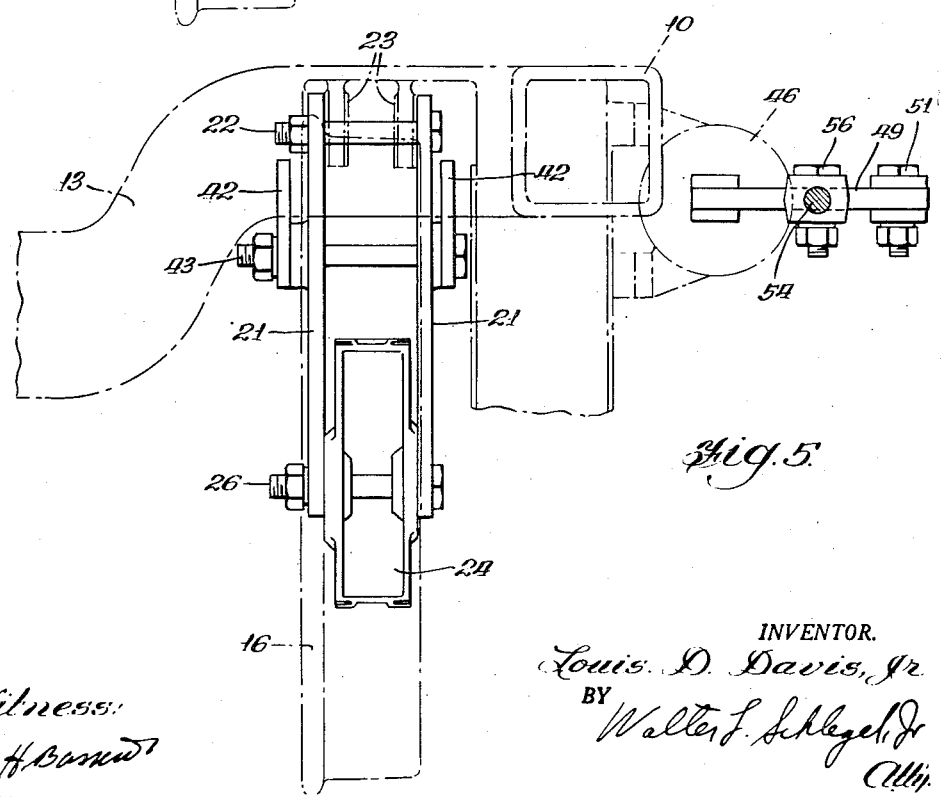
Figure 5 is a transverse sectional view taken along the line 5—5 of Figure 1.

Referring now to the drawings for a better understanding of the invention, the unit cylinder clasp brake arrangement is shown as mounted on one side of a four wheel railway car truck, a similar brake arrangement being mounted on the opposite side of the truck. As the two brake arrangements are similar in construction and operation, only one arrangement is herein shown and described to avoid repetition.

The truck is shown as comprising a one-piece frame 7 resiliently supported at its ends upon wheel and axle assemblies 8 and 9. The truck frame 7 comprises side rails 10—10 interconnected by end rails 11 and 12 and transoms 13 and 14 disposed between the wheel and axle assemblies. Pedestal jaws 15—15 are provided adjacent the ends of each side rail 11 to slidably receive conventional journal boxes (not shown) in which the ends of the wheel and axle assemblies are journaled. The assembly 8 comprises wheels 16—16 scured to opposite ends of an axle 17, and the assembly 9 comprises wheels 18—18 secured to opposite ends of an axle 19.

The clasp brake structure, indicated generally at 20, associated with the wheel 16 is shown as comprising spaced inner brake hangers 21—21 pivotally connected by means of a bolt 22 to bosses 23 provided on the transom 13, the lower ends of the hangers straddling a brake head 24 and being pivotally connected thereto by means of a bolt 26 which also serves to frictionally engage the hangers against opposite sides of the brake head to yieldably resist pivotal movement of the brake head relative to the hangers. A conventional brake shoe 27 is detachably connected to the brake head 24 for frictional braking engagement with the tread surface of the wheel 16.

Spaced outer brake hangers 28—28 are pivotally connected at 29 to bosses 31 provided on the end rail 11, the lower ends of the hangers straddling a brake head 32 and being pivotally connected thereto by a bolt 33 which also serves to frictionally engage the hangers against opposite sides of the brake head to yieldably resist pivotal movement of the head relative to the hangers. A brake shoe 34 is secured on the brake head 32 to frictionally engage the tread surface of the wheel 16.

The lower end of a brake lever 36 is pivotally connected to the brake head 32 by means of the bolt 33 and the upper end of the lever is connected by means of clevises 37 to the inboard end of a dead actuating lever 38 which is pivotally connected at 39 to and between vertically spaced bosses 41—41 provided on the side rail 10 adjacent its juncture with the end rail 11.

The inner brake hangers 21—21 and brake lever 36 are interconnected intermediate their ends by tie straps 42—42 which are disposed on opposite sides of the wheel 16 above the axle 17. The straps are pivotally connected to the hangers by a bolt 43 and are pivotally connected to the lever by a bolt 44.

As a clasp brake structure 20a, provided for the wheel 18, is identical in construction and operation to the brake structure 20 heretofore described with respect to the wheel 16, corresponding numbers, followed by the letter "a" have been applied to corrseponding parts in the drawing and a further description of the brake structure 20a has been omitted to avoid repetition.

A piston-cylinder power means 46 is secured on the outboard side of the side rail 10 by means of bolts or screws and is adapted to be connected to a suitable source of pressure fluid to cause axial movement of a piston rod 47 pivotally connected at 48 to one end of a live cylinder lever 49. The other end of the live cylinder lever 49 is pivotally connected at 51 to one end of a pull rod 52 which has its other end pivotally connected at 53 to the outboard end of the dead actuating lever 38.

A slack adjuster rod 54 is pivotally connected at 56 to the live cylinder lever 49 intermediate the ends of the latter and is connected at its other end to a conventional slack adjuster 57 which is pivotally connected at 58 to a dead slack adjuster lever 59 intermediate the ends of the latter. The slack adjuster lever 59 is pivotally mounted at 61 on a bracket 62 fixed on the side rail 10 and has its outboard end pivotally connected at 63 to one end of a pull rod 64 which has its other end pivotally connected at 66 to the outboard end of a dead actuating lever 38a employed to actuate the clasp brake structure 20a.

In the operation of the brake arrangement thus shown and described to frictionally engage the brake shoes against diametrically opposed sides of their respective wheels 16 and 18, pressure fluid is directed into the power means 46 which acts to move the live cylinder lever 49, rod 54, lever 59 and rod 64 longitudinally of the truck to pivot the actuating lever 38a in a counterclockwise direction. Simultaneously therewith, the power means 46 acts through the live cylinder lever 49 to move the rod 52 longitudinally of the truck to pivot the actuating lever 38 in a clockwise direction.

The actuating lever 38 then acts through the brake lever 36 and straps 42—42 to pivot the hangers 21 and 28 toward each other to frictionally engage the brake shoes 27 and 34 against opposite sides of the wheel 16. The actuating lever 38a also acts through the brake lever 36a and straps 42a—42a to pivot the hangers 21a and 28a toward each other to frictionally engage their respective brake shoes 27a and 34a against opposite sides of the wheel 18.

It is contemplated that suitable brackets may be provided on the side rail 10 of the truck frame to slidably support the levers 49 and 59 and the rods connected thereto.

I claim:

1. In a tread brake arrangement for a railway car truck comprising a frame and a pair of supporting wheel and axle assemblies, the combination of: friction means disposed adjacent and engageable with the respective assemblies, inner and outer brake hanger levers for each of the wheel and axle assemblies supported by the frame at their upper ends and pivotally carrying said friction means at their lower ends, vertically disposed live brake levers pivotally connected at their lower ends to said outer brake hanger levers and their respective friction means, tie straps disposed on opposite sides of each wheel of said assemblies, said tie straps having their opposite corresponding ends interconnecting their related live brake levers and their related inner brake hanger levers, a pair of dead actuating levers fulcrumed intermediate their ends to the ends of the frame, said dead actuating levers being pivotally connected at their inboard ends to the upper ends of said live brake levers, a power cylinder member mounted on the frame, a live cylinder lever having its inboard end pivotally connected to the power cylinder member, a dead operating lever having its inboard end pivotally mounted on the frame, pull rods connecting the outboard ends of the dead actuating levers to the outboard ends of the operating lever and live cylinder lever, and a pull rod connecting the operating lever and live cylinder lever intermediate their ends, said dead operating lever, power cylinder member, live cylinder lever, pull rods, and dead actuating levers being spaced downwardly from the upper surface of the frame, said dead operating lever, pull rods, live cylinder lever, and power cylinder member being substantially coplanar.

2. In a tread brake arrangement for a railway car truck comprising a frame and a pair of supporting wheel and axle assemblies, the combination of: brake means engageable with and disposed adjacent the respective assemblies, said brake means comprising pairs of inner and outer brake hanger levers for each of the wheel and axle assemblies pivotally suspended at their upper ends by the frame, brake shoe assemblies pivotally suspended on the lower ends of said inner and outer levers, vertically disposed live brake levers extending between said outer hanger levers and being pivotally connected at their lower ends to said outer hanger levers and their brake shoe assemblies, tie straps disposed on opposite sides of each wheel of said assemblies, said straps interconnecting their related vertical brake levers and their related inner brake hanger levers, a pair of dead actuating levers fulcrumed intermediate their ends to the ends of the frame and operatively connected at their inboard ends to the upper ends of the respective live brake levers, a power cylinder member mounted on the frame, a live cylinder lever connected at its inboard end to the power cylinder member, a dead slack adjuster lever connected at its inboard end to the frame, pull rods connecting the outboard ends of the dead actuating levers to the outboard ends of the cylinder and slack adjuster levers, a slack adjuster member connected to the slack adjuster lever intermediate the ends thereof, and a slack adjuster rod connecting the slack adjuster member to the cylinder lever intermediate the ends thereof.

3. In a tread brake arrangement for a railway car truck comprising a frame and a pair of supporting wheel and axle assemblies, the combination of: pairs of inner and outer brake hanger levers disposed on opposite sides of each of the said assemblies, said levers being pivotally suspended at their upper ends to said frame, friction shoe assemblies pivotally carried at the lower ends of said inner and outer levers, vertically disposed live brake levers extending between said pairs of outer levers and being pivotally connected at their lower ends to said outer hanger levers and their related friction shoe assemblies, tie bars disposed on opposite sides of each wheel of said assemblies and interconnecting their related inner brake hanger levers and their related live brake levers, dead actuating levers fulcrumed intermediate their ends to the frame and having their inboard ends connected to the upper ends of the respective brake levers, power means mounted on the frame, a dead operating lever fulcrumed at its inboard end to the frame, a cylinder lever connected at its inboard end to the power means, a slack adjuster and slack adjuster rod interconnecting the dead operating lever and cylinder lever intermediate their ends, pull bars interconnecting the outboard ends of the dead operating lever and cylinder lever to their respective dead actuating lever, said pull bars being disposed with the extension of their axes intersecting the longitudinal vertical center plane of the truck beyond the ends thereof.

4. In a tread brake arrangement for a railway car truck comprising a frame having downwardly offset ends and a pair of supporting wheel and axle assemblies, the combination of: friction means disposed adjacent and engageable with respective assemblies, inner and outer brake hanger levers for each of the wheel and axle assemblies pivotally supported at their upper ends by said frame, said fraction means being pivotally carried by said levers at the lower ends thereof, live brake levers pivotally connected to the outer levers and their respective friction means, tie rods interconnecting their related brake levers and their related inner hanger levers, dead actuating levers fulcrumed intermediate the ends thereof to the downwardly offset ends of the frame, said dead actuating levers having upwardly offset ends pivotally connected to the upper ends of the live brake levers, said dead levers having their opposite ends downwardly offset, power cylinder means mounted on the frame, a live cylinder lever having its inboard end connected to the power cylinder means, a dead operating lever having its inboard end connected to the frame, a slack adjuster and slack adjuster rod interconnecting the operating lever and cylinder lever intermediate their ends, and pull rods interconnecting the outboard ends of the operating lever and cylinder lever to the downwardly offset ends of the respective dead actuating levers, the downwardly offset ends of the dead actuating levers, the power cylinder means, live cylinder lever, dead operating lever, pull rods, slack adjuster and slack adjuster rod being disposed in a common horizontal plane.

References Cited in the file of this patent

UNITED STATES PATENTS

| | | |
|---|---|---|
| 1,921,599 | Aurien | Aug. 8, 1933 |
| 2,135,120 | Baselt | Nov. 1, 1938 |
| 2,135,121 | Baselt | Nov. 1, 1938 |
| 2,179,387 | Tack | Nov. 7, 1939 |